United States Patent
Mukherjee

(10) Patent No.: US 11,263,043 B1
(45) Date of Patent: Mar. 1, 2022

(54) MANAGING PROCESSOR CORE SYNCHRONIZATION USING INTERRUPTS

(71) Applicant: Marvell Asia Pte, Ltd., Singapore (SG)

(72) Inventor: Shubhendu Sekhar Mukherjee, Southborough, MA (US)

(73) Assignee: Marvell Asia Pte, Ltd., Singapore (SG)

(*) Notice: Subject to any disclaimer, the term of this patent is extended or adjusted under 35 U.S.C. 154(b) by 72 days.

(21) Appl. No.: 16/862,698

(22) Filed: Apr. 30, 2020

Related U.S. Application Data

(60) Provisional application No. 62/876,452, filed on Jul. 19, 2019.

(51) Int. Cl.
| | |
|---|---|
| *G06F 9/48* | (2006.01) |
| *G06F 9/30* | (2018.01) |
| *G06F 12/1045* | (2016.01) |
| *G06F 9/54* | (2006.01) |
| *G06F 12/0831* | (2016.01) |
| *G06F 9/38* | (2018.01) |

(52) U.S. Cl.
CPC ........ *G06F 9/4812* (2013.01); *G06F 9/30079* (2013.01); *G06F 9/30087* (2013.01); *G06F 9/3836* (2013.01); *G06F 9/546* (2013.01); *G06F 12/0833* (2013.01); *G06F 12/1054* (2013.01); *G06F 12/1063* (2013.01)

(58) Field of Classification Search
CPC .... G06F 9/4812; G06F 9/546; G06F 9/30087; G06F 9/30079; G06F 9/3836; G06F 12/1054; G06F 12/1063; G06F 12/0833
See application file for complete search history.

(56) References Cited

U.S. PATENT DOCUMENTS

| | | | |
|---|---|---|---|
| 5,689,713 A * | 11/1997 | Normoyle | G06F 9/546 710/260 |
| 6,119,204 A | 9/2000 | Chang | |
| 6,205,508 B1 * | 3/2001 | Bailey | G06F 13/26 710/260 |
| 6,370,632 B1 | 4/2002 | Kikuta | |
| 9,501,425 B2 | 11/2016 | Mukherjee et al. | |
| 9,665,505 B2 | 5/2017 | Mukherjee et al. | |
| 9,710,394 B2 | 7/2017 | Guthrie et al. | |
| 9,779,028 B1 | 10/2017 | Mukherjee et al. | |

(Continued)

*Primary Examiner* — Farley Abad
(74) *Attorney, Agent, or Firm* — Young Basile Hanlon & MacFarlane, P.C.

(57) ABSTRACT

Interrupt messages are sent from an interrupt controller to respective processor cores and data synchronization is managed among the processor cores. Each processor core includes a pipeline that includes a plurality of stages through which instructions of a program are executed, where stored order information indicates whether a state of the pipeline is in-order or out-of-order; and circuitry for receiving interrupt messages from the interrupt controller and performing an interrupt action in response to a corresponding interrupt message after ensuring that the order information indicates that the state of the pipeline is in-order when each interrupt action is performed. Managing the data synchronization includes generating a first interrupt message at an issuing processor core in response to a synchronization related instruction executed at the issuing processor core; and receiving the first interrupt message at each receiving processor core in a set of one or more receiving processor cores.

30 Claims, 6 Drawing Sheets

(56) References Cited

U.S. PATENT DOCUMENTS

| | | |
|---|---|---|
| 9,870,328 B2 | 1/2018 | Mukherjee et al. |
| 10,216,662 B2 * | 2/2019 | Mishaeli ................. G06F 13/24 |
| 10,817,300 B2 | 10/2020 | Mukherjee et al. |
| 2004/0215898 A1 | 10/2004 | Arimilli |
| 2010/0332786 A1 * | 12/2010 | Grohoski .............. G06F 9/3851 |
| | | 711/207 |
| 2014/0013021 A1 * | 1/2014 | Matsumoto ............. G06F 13/24 |
| | | 710/267 |
| 2018/0088951 A1 * | 3/2018 | Penton ................ G06F 9/30123 |

* cited by examiner

MANAGING PROCESSOR CORE SYNCHRONIZATION USING INTERRUPTS

CROSS-REFERENCE TO RELATED APPLICATION(S)

This application claims priority to and the benefit of U.S. Provisional Application Patent Ser. No. 62/876,452, filed Jul. 19, 2019, the entire disclosure of which is hereby incorporated by reference.

TECHNICAL FIELD

This disclosure relates to managing processor core synchronization using interrupts (e.g., interrupts associated with synchronization of translation lookaside buffer invalidation).

BACKGROUND

Many computing systems utilize virtual memory systems to allow programmers to access memory addresses without having to account for where the memory addresses reside in the physical memory hierarchies of the computing systems. To do so, virtual memory systems maintain a mapping of virtual memory addresses to physical memory addresses that store the actual data referenced by the virtual memory addresses. The physical memory addresses can reside in any type of storage device (e.g., SRAM, DRAM, magnetic disk, etc.).

When a program accesses a virtual memory address, the virtual memory system performs an address translation to determine which physical memory address is referenced by the virtual memory address. The data stored at the determined physical memory address is read from the physical memory address, as an offset within a memory page, and returned for use by the program. The virtual-to-physical address mappings are stored in a "page table." In some cases, the virtual memory address may be located in a page of a large virtual address space that translates to a page of physical memory that is not currently resident in main memory (i.e., a page fault), so that page is then copied into main memory.

Modern computing systems include one or more translation lookaside buffers (TLBs), which are caches for the page table used by the virtual memory system to improve the speed of virtual to physical memory address translation. Very generally, a TLB includes a number of entries from the page table, each entry including a mapping from a virtual address to a physical address. In general, the entries of the TLB cover only a portion of the total memory available to the computing system. In some examples, the entries of the TLB are maintained such that the portion of the total available memory covered by the TLB includes the most recently accessed, most commonly accessed, or most likely to be accessed portion of the total available memory.

SUMMARY

In one aspect, in general, a method includes sending interrupt messages from an interrupt controller to respective processor cores and managing data synchronization among the processor cores. Each processor core includes a pipeline that includes a plurality of stages through which instructions of a program are executed, where stored order information indicates whether a state of the pipeline is in-order or out-of-order with respect to instructions that have been issued but are not yet committed; and circuitry for receiving interrupt messages from the interrupt controller and performing an interrupt action in response to a corresponding interrupt message after ensuring that the order information indicates that the state of the pipeline is in-order when each interrupt action is performed. Managing the data synchronization among the processor cores includes generating a first interrupt message at an issuing processor core in response to a synchronization related instruction executed at the issuing processor core; and receiving the first interrupt message at each receiving processor core in a set of one or more receiving processor cores.

In another aspect, in general, an integrated circuit includes an interrupt controller and a plurality of processor cores. Each processor core includes a pipeline that includes a plurality of stages through which instructions of a program are executed, where stored order information indicates whether a state of the pipeline is in-order or out-of-order with respect to instructions that have been issued but are not yet committed; and circuitry for receiving interrupt messages from the interrupt controller and performing an interrupt action in response to a corresponding interrupt message after ensuring that the order information indicates that the state of the pipeline is in-order when each interrupt action is performed. The processor cores each includes circuitry configured to manage data synchronization among the processor cores. The managing includes generating a first interrupt message at an issuing processor core in response to a synchronization related instruction executed at the issuing processor core; and receiving the first interrupt message at each processor core in a set of one or more receiving processor cores.

Aspects can include one or more of the following features.

Each processor core further includes: a translation lookaside buffer (TLB) storing translation information for translating virtual addresses to physical addresses and configured to invalidate translation information associated with one or more virtual addresses in response to a TLB invalidation (TLBI) operation being received.

The interrupt action associated with the first interrupt message comprises ensuring all TLBI operations received at the processor core receiving the first interrupt message, before the first interrupt message was received, have been completed.

The interrupt messages received from the interrupt controller include: software interrupts that have corresponding interrupt actions performed in software with one or more instructions for performing the corresponding interrupt action being executed in the pipeline of the processor core receiving a software interrupt, and hardware interrupts that have corresponding interrupt actions performed in hardware without any instructions for performing the corresponding interrupt action being executed in the pipeline of the processor core receiving a hardware interrupt.

The interrupt action associated with the first interrupt message is a hardware action.

Each TLBI operation is received at a receiving processor core in an interrupt message.

The managing comprises: receiving, from the issuing processor core, at the receiving processor cores, respective TLBI instructions; receiving, from the issuing processor core and at the interrupt controller, the first interrupt message, wherein the first interrupt message indicates a request from the issuing processor core to be notified of when the respective TLBI instructions are completed by the receiving processor cores; forwarding, by the interrupt controller, the first interrupt message to each of the receiving processor cores; and in response to receiving a respective interrupt acknowledgement from each of the receiving processor cores, signaling, by the interrupt controller to the issuing processor core, completion of the interrupt action corresponding to the first interrupt message, wherein the each receiving processor core sends a respective interrupt acknowledgement to the interrupt controller, in response to retiring, by the each receiving processor core, the respective TLBI instructions.

In response to receiving, by the receiving processor core, the first interrupt message, the receiving processor core attaches the first interrupt message to an instruction of the receiving processor core.

The receiving processor core retires all instructions preceding the instruction in program order; and the receiving processor core, after the retiring, sends an interrupt acknowledgement to the interrupt controller.

Sending, by the receiving processor core and after the retiring, the interrupt acknowledgement to the interrupt controller comprises: updating, by the receiving processor core, a register of the interrupt controller to indicate the interrupt acknowledgement.

The receiving processor core, in response to receiving the first interrupt message, inserts a trap instruction into a program of the receiving processor core.

The first interrupt message is received at the interrupt controller at an interrupt line that is not software-visible.

The interrupt controller includes a plurality of storage elements, each storage element storing interrupt messages for a particular processor core.

The set of receiving processor cores includes all processor cores other than the issuing processor core.

The managing further comprises: after the interrupt action corresponding to the first interrupt message has been completed at each processor core in the set, sending at least one acknowledgement to the issuing processor core.

The at least one acknowledgement comprises acknowledgements sent from each processor core in the set to the interrupt controller and an acknowledgement sent from the interrupt controller to the issuing processor core.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

For a variety of reasons, a mapping between a virtual address and a physical address may become invalid. For example, a computing system's virtual memory system may change its mappings between virtual memory addresses and physical memory addresses. If the mapping is stored as an entry in a TLB, the entry in the TLB is invalidated to avoid returning incorrect data to a program that uses the virtual address. In some examples, computing systems provide an instruction for invalidating TLB entries, sometimes referred to as a TLB invalidate (TLBI) instruction. When a mapping between a virtual address and a physical address becomes invalid, a TLBI instruction is issued for the mapping. When the TLBI instruction for the mapping is received, any entry in the TLB corresponding to the mapping is invalidated (e.g., marked as invalid, or removed).

Some computing architectures contain global broadcast instructions that are sent to all cores (or all other cores if sent from one of the cores), such as the following two instructions: a TLBI instruction and a Global Synchronization (i.e., GlobalSync) instruction. TLBIs are instructions in the ARM instruction set. Some TLBI instructions are local and some are global. A local TLBI instruction is handled by the core that issues the TLBI instruction. A global TLBI instruction is broadcast to every core in a system-on-a-chip (SOC), typically denoted as the inner shareable domain. A GlobalSync can be issued as a side-effect of a Data Synchronization Barrier (DSB) instruction. A GlobalSync reaches every core and ensures that the effect of a broadcast (i.e., global) TLBI has been completed within the receiving core. Typically, a TLBI invalidates all translations corresponding to the TLBI payload (e.g., one or more virtual memory addresses to be invalidated). A TLBI also flushes out any pending stores from the core to ensure that there are no pending writes to pages that are getting invalidated in the translation lookaside buffers. The disclosure herein relates, mainly, to global (i.e., broadcast) TLBI instructions. Thus, references below of TLBI instructions, unless the context implies otherwise, mean global (i.e., broadcast) TLBI instructions.

Thus, in computing systems with multiple processor cores (e.g., cores of a multi-core processor), certain TLBI instructions issued at a first processor core may be broadcast to some or all of the other, remote (i.e., receiving) processor cores in the computing system. The terms processing unit, processing element, processor element, processor unit, processor core, or core are used interchangeably. In some situations, there is a need to synchronize the multiple processor cores by suspending processing at the first processor core until all of the TLBI instructions that it has broadcast have completed at all of the remote processor cores. Approaches described herein can be used to efficiently accomplish this synchronization.

Figure 1:
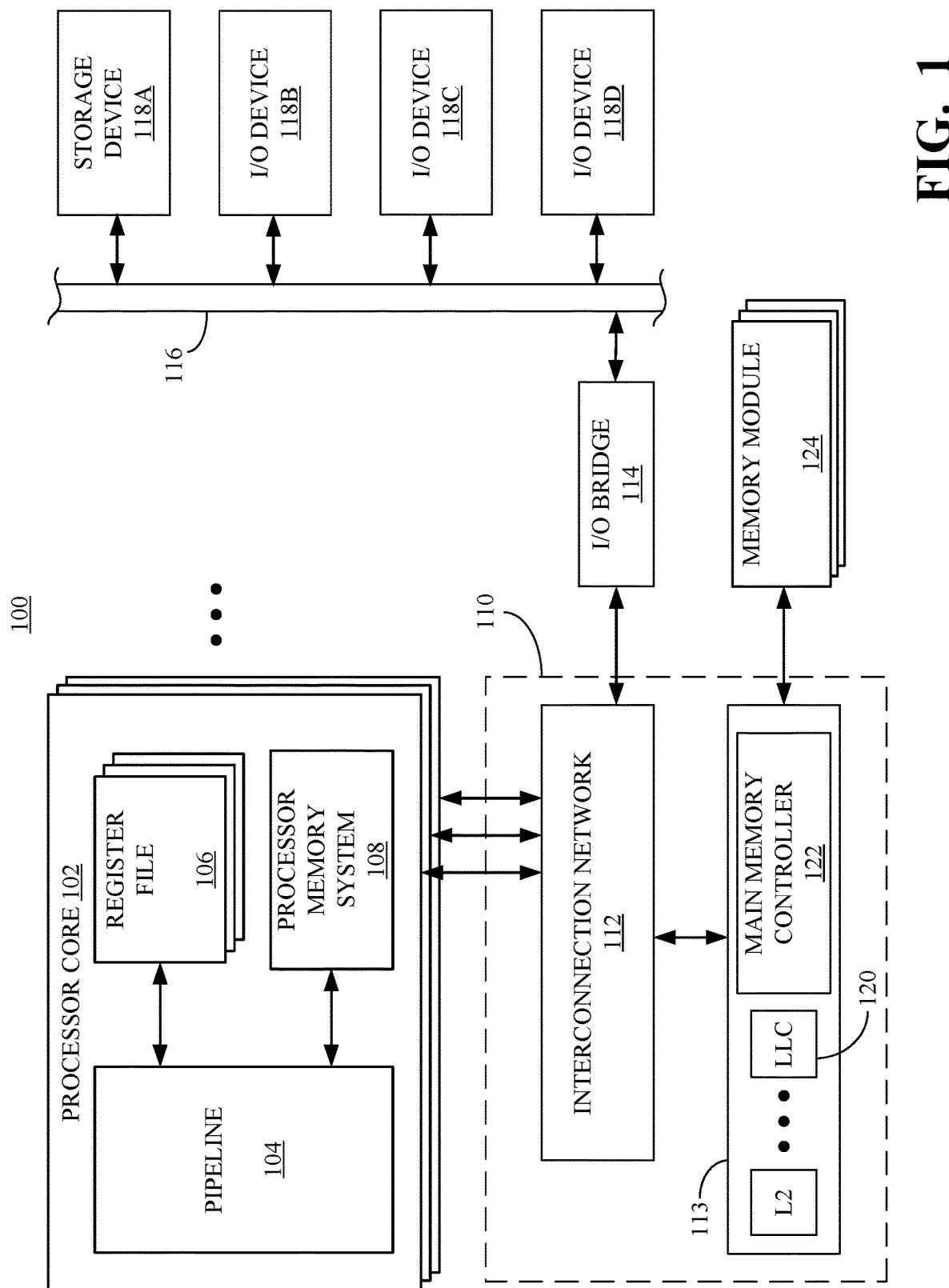
FIG. 1 is a high-level block diagram of an example of a computing system 100.
Figure 2:
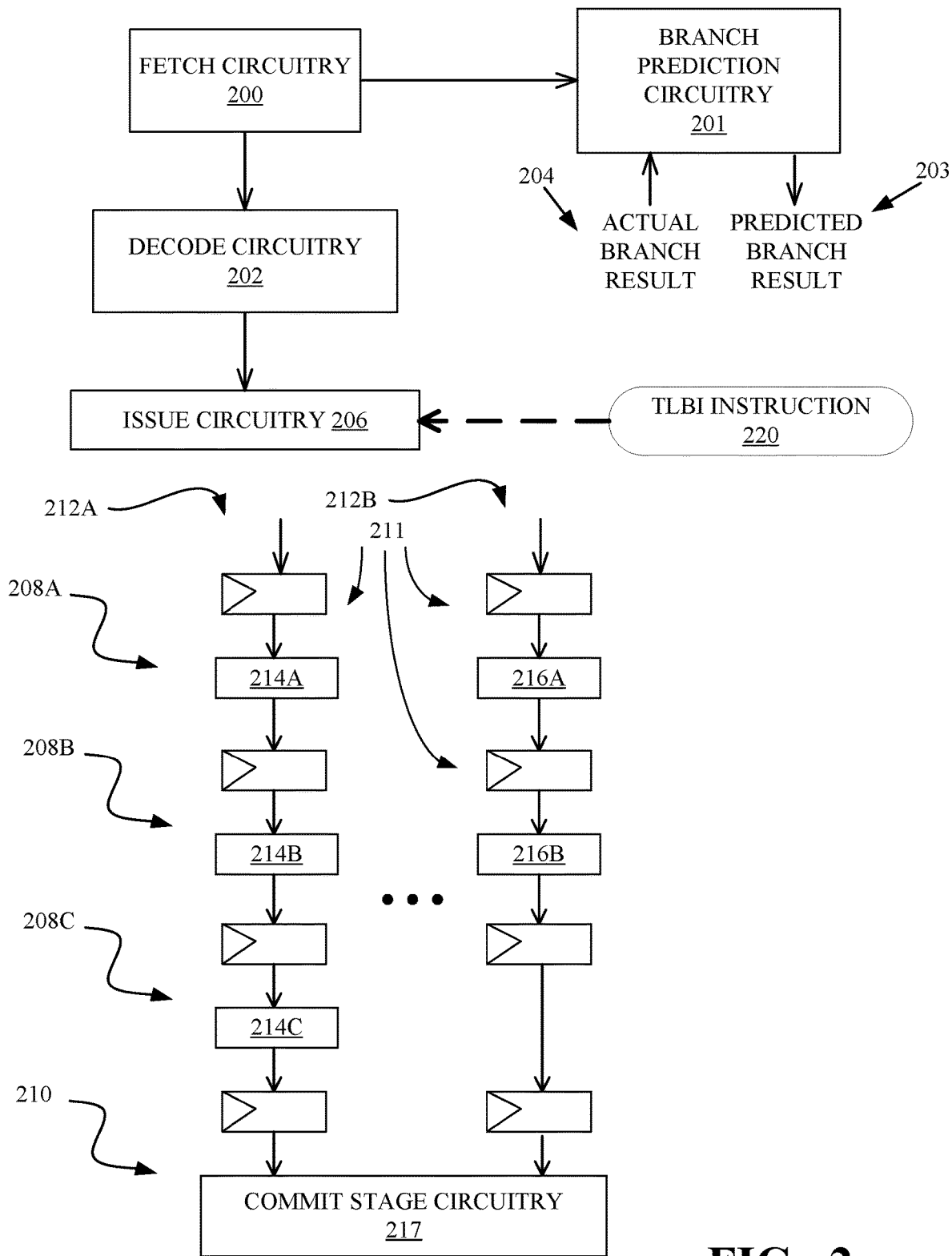
FIG. 2 is an example of a configuration of the pipeline of FIG. 1.
Figure 3:
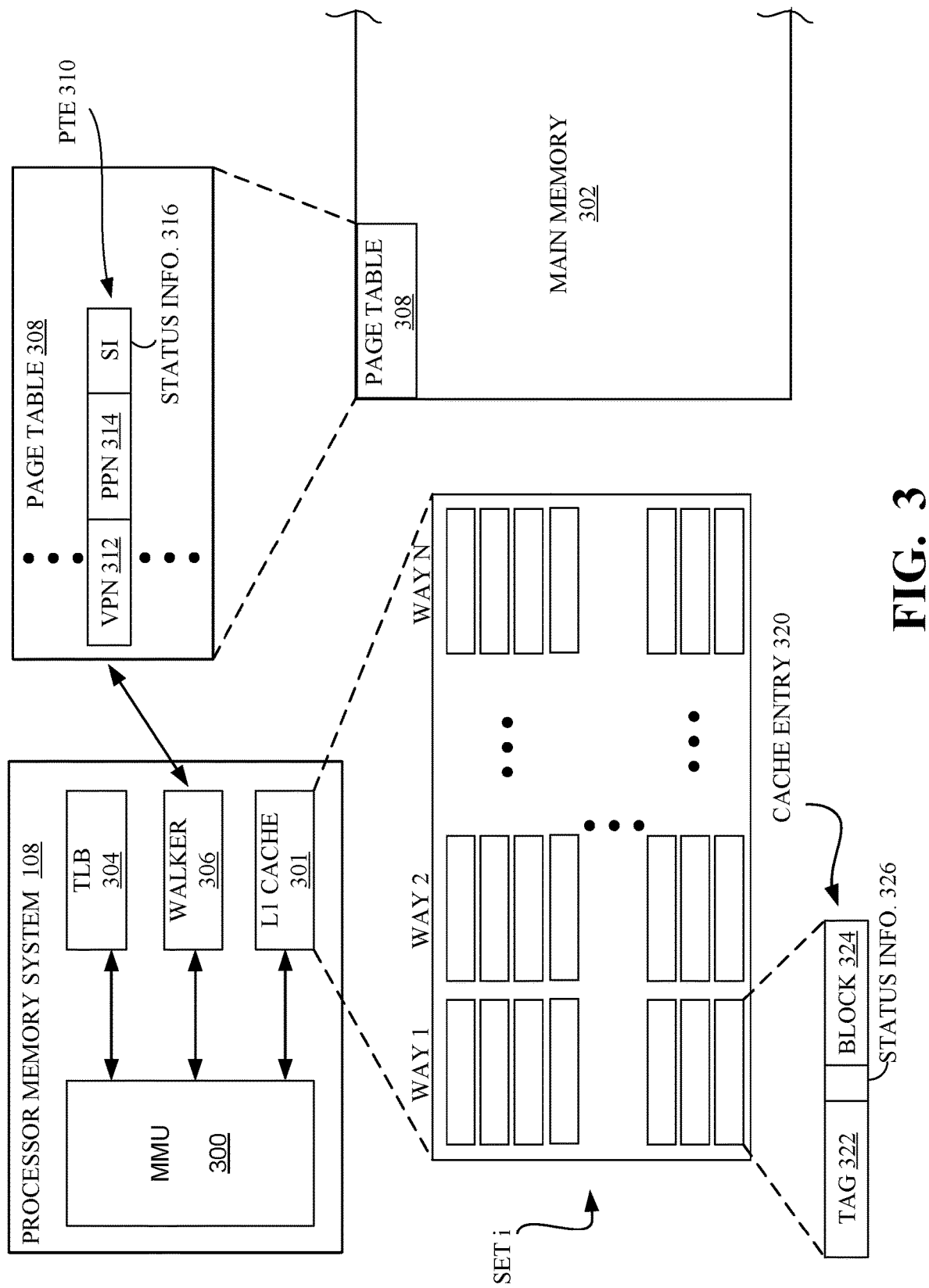
FIG. 3 is an example of a configuration of the processor memory system of FIG. 1.

Further details of techniques for managing processor core synchronization using interrupts are described herein with initial reference to a system in which they can be implemented, as shown in FIGS. 1 through 3.

FIG. 1 is a high-level block diagram of an example of a computing system 100. The computing system 100 includes at least one processor core 102, which can be a single central processor core (CPU) or one of multiple processor cores in a multi-core architecture. In a multi-core architecture each processor core (or simply "core") can include an individual CPU with associated circuitry. In this example of a multi-core architecture, each processor core 102 can include a pipeline 104, one or more register files 106, and a processor memory system 108. Each register file of the register files 106 can include one or more individually addressable registers.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, ..., LN. The L1 level is a lower level memory than the L2 memory system, which in turn is a lower level than the L3 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, ...) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units of cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed (i.e., retired) so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an example of the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217. Instead, the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 212A and 212B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast global TLBIs have been completed. Said another way, an originating processor core that issues a global TLBI instruction can subsequently issue a data synchronization barrier (DSB) instruction, which in turn causes GlobalSync instructions to be received by every other processor core. Processing a TLBI instruction or GlobalSync instruction appropriately as it is inserted within the pipeline of the receiving processor core may call for certain steps to be taken to manage the state of the pipeline. For example, the core may need to ensure that a GlobalSync instruction is executed in program order with respect to the executing stream of instructions, or may need to ensure that a TLBI instruction is not inserted between certain micro-instructions to avoid deadlocks. One way to handle such instructions could be to drain the pipeline, but that could cause performance degradation.

As further described below, instead of inserting a TLBI or GlobalSync instruction into the pipeline, the TLBI or GlobalSync operations can be performed as actions that are taken in response to an interrupt (e.g., a TLBI interrupt or GlobalSync interrupt). That is, when a TLBI interrupt or GlobalSync interrupt is asserted for a processor core, the processor core can perform a TLBI interrupt action or GlobalSync interrupt action without requiring insertion of any external instruction into its pipeline. Since interrupts actions are performed in a manner that ensures that no deadlocks will occur, and that the pipeline state is in program order, interrupts are a low-overhead mechanism for performing TLBI and/or GlobalSync operations. Furthermore, in some implementations, these interrupts can be processed in hardware without the need for a software interrupt handler. In response to the GlobalSync operation, after the receiving processor core completes the TLBI instruction(s) or operation(s) that are outstanding, the receiving processor core sends, or causes to be sent, an acknowledgement to the originating process core (from which the GlobalSync interrupt was originated). As further described below, the acknowledgement can be an interrupt acknowledgement. After the originating processor core receives acknowledgements from all receiving processor cores, the issuing processor core can proceed with instruction execution.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1).

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data. The cache entry 320 can also include bits for storing status information 326. The status information 326 can include, for example, a valid bit, flags or error correction bits, other bits, or any combination thereof.

Figure 4:
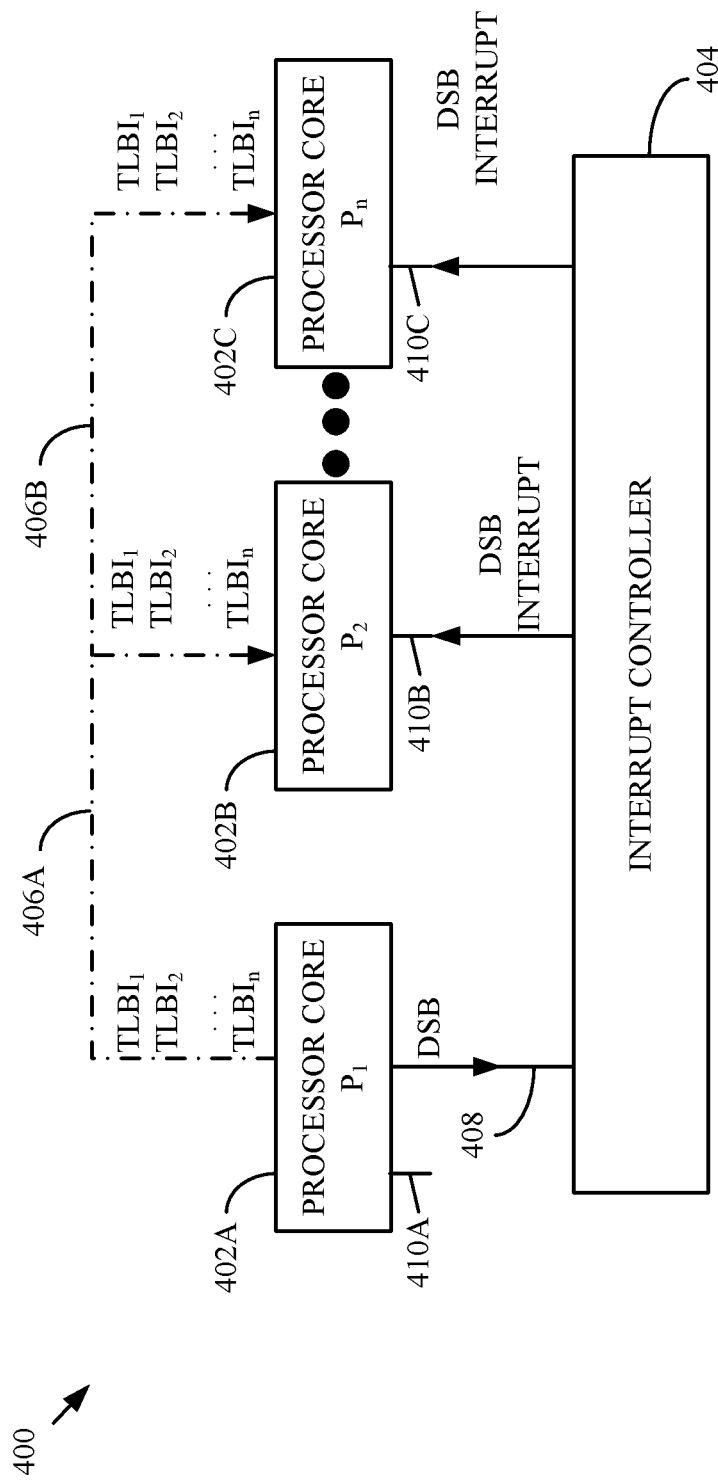
FIG. 4 is an example of an apparatus for managing processor core synchronization.

FIG. 4 is an example of an apparatus 400 for managing processor core synchronization, for example, in the context of translation lookaside buffer (TLB) invalidation. The apparatus 400 can be the computing system 100 of FIG. 1. The apparatus 400 includes two or more processor cores, such as the processor cores 402A-402C. Three processor cores 402 are shown in FIG. 4. However, the apparatus 400 can include two or more than three processor cores. Each of the processor cores 402A-402C can be a processor core 102 of FIG. 1.

Each of the processor cores 402A-402C can include a respective translation lookaside buffer (TLB), which can be as described with respect to FIG. 3. In this example, TLBI operations will be performed using TLBI instructions inserted into processor pipelines, and GlobalSync operations will be performed using an interrupt mechanism. In other examples, TLBI operations can also be performed using an interrupt mechanism.

A processor core (i.e., an issuing processor core) can issue TLBI instructions. In some examples, a TLBI instruction includes a virtual memory address and causes invalidation of any TLB entries associated with the virtual memory address. That is, when a TLB receives a TLBI for a given virtual memory address, any entries in the TLB that store mappings between the given virtual memory address and a physical memory address are invalidated. It is to be noted that, while TLBI instructions generally include a virtual memory address for invalidation as an argument, in some examples, and for the sake of simplicity, TLBI instructions are described herein as including a mapping for invalidation as an argument. In some examples, a TLBI instruction includes context information such as a process identifier, a virtual machine identifier, an exception level, more, fewer, other context information, or a combination thereof.

To reiterate, some TLBI instructions are global TLBI instructions broadcasts by an issuing processor core, and each of the TLBI instructions received is handled by every other processing (i.e., receiving processor cores) in the apparatus 400. As mentioned above with respect to TLBI instruction 220, a receiving processor core inserts a received TLBI instruction into its pipeline. Handling the TLBI instructions (i.e., performing a TLBI operation) can be done by invalidating (such as by setting an invalid bit), removing from the TLB, or the like, entries indicated in the TLBI instruction. In an example, the TLBI instruction can indicate the virtual address(es) to be invalidated. The receiving processor core can handle the TLBI instruction by, for example, searching for the virtual address(es) to identify the relevant entry(ies) in the TLB and invalidating or removing the identified entry(ies).

From an issuing processor core perspective, the TLBI instruction is complete when all memory accesses using the TLB entry(ies) that is (are) invalidated is (are) complete. The completion of any global TLBI instruction from an issuing processor core includes the completion of the TLBI instruction on all receiving processor cores.

The issuing processor core may issue more than one global TLBI instruction. When an issuing processor core is ready to confirm completion of all the global TLBI instructions that the issuing processor core has issued, the issuing processor core issues a data synchronization barrier (DSB) instruction that triggers a request to each of the receiving processor cores to complete their respective TLBI instructions. In this example, this request is in the form of a DSB/GlobalSync interrupt asserted at all the receiving processor cores. A receiving processor core responds to the DSB/GlobalSync interrupt after all memory accesses that occur before the DSB/GlobalSync interrupt have completed before the completion of (i.e., responding to) the DSB/GlobalSync interrupt.

In an example, each processor core can include a remote TLBI counter. The remote TLBI counter indicates a number of TLBI instructions in the pipeline of the processor core that were received from remote (e.g., issuing) processor cores. The remote TLBI counter can be initialized to zero. When a new TLBI instruction is received by the processor core, the processor core increments the remote TLBI counter by one. When a TLBI instruction is retired, the remote TLBI counter is decremented by one.

In an example, each processor core can include an issued TLBI counter. The issued TLBI counter indicates a number of (global) TLBI instructions that the processor core sent (e.g., broadcast, etc.) to remote (i.e., receiving) processor cores. The issued TLBI counter can be initialized to zero. When a new (global) TLBI instruction is broadcast by the processor core, the processor core increments the issued TLBI counter by one. When the processor core receives acknowledgements that the receiving processor cores have retired the TLBI instructions broadcast by the processor core, the processor core rests the issued TLBI counter to zero. In another example, an issued TLBI counter is not used. The acknowledgements that the receiving processor cores have retired the TLBI instructions can be one or more DSB/GlobalSync interrupt acknowledgements.

FIG. 4 illustrates that the processor core 402A (i.e., the issuing processor core) issued the TLBI instructions $TLBI_1$, $TLBI_2, \ldots, TLBI_n$. The issuing processor core can issue any number of one or more TLBI instructions. The issued global TLBI instructions can be received by each of the other processor cores (i.e., the receiving processor cores). In FIG. 4, the processor cores 402B-402C are the receiving processor cores.

Any number of mechanisms can be available for delivering the global TLBI instructions to the receiving processor cores. In an example, a broadcast element (not shown), that is similar to the broadcast element described in U.S. Pat. No. 9,501,425, entitled "TRANSLATION LOOKASIDE BUFFER MANAGEMENT," which is incorporated herein by reference, can be used. The broadcast element can be a central element that receives all global TLBI instructions and sends the received TLBI instructions to all, except the sending, processor cores.

In another example, an issuing processor core can cause a TLBI operation to be performed at a receiving processor core via an interrupt message (i.e., a TLBI interrupt). That is, the issuing processor core can issue (i.e., assert) a TLBI interrupt. The TLBI interrupt can be sent to each receiving processor core by an interrupt controller 404. The TLBI interrupt can include the virtual address to be invalidated. In response to receiving the TLBI interrupt, a receiving processor core can perform a TLBI operation. Other mechanisms for performing TLBI operations at the receiving processor cores are possible.

The interrupt controller 404 can be configured to receive interrupt signals and forward the interrupt signals to intended processor cores. The interrupt controller can be configured to receive interrupts from external devices, such as peripheral Input/Output devices. The interrupt controller can be configured to receive internal interrupts, such as from each of the processor cores 402A-402C.

Some of the interrupts received by the interrupt controller 404 can be software interrupts. A software interrupt is such that when a processor core receives the interrupt, the processor core invokes a software handler for handling the interrupt. As such, software interrupts have corresponding interrupt actions performed in software. One or more instructions for performing the corresponding interrupt action can be executed in the pipeline of the processor core receiving a software interrupt.

Some of the interrupts received by the interrupt controller 404 may not be software-visible interrupts. Such interrupts are referred to herein as hardware interrupts. The apparatus 400, or a processor core 402A-40C that receives an interrupt that is not software-visible, can include circuitry (i.e., hardware) to handle the interrupt. As such, hardware interrupts have corresponding interrupt actions performed in hardware without any instructions for performing the corresponding interrupt action being executed in the pipeline of the processor core receiving a hardware interrupt.

The interrupt controller 404 can be partitioned into (i.e., can include circuitry, modules, etc., for) a distributor component (not shown) and an interface component (not shown). The distributor component can be connected to interrupt sources. The distributor component can be connected to each of the processor cores 402A-402C, which can issue DSB/GlobalSync interrupts and/or TLBI interrupts. The distributor can set the target processor core list of each interrupt. That is, when an interrupt arrives at the interrupt controller 404, the distributor can set (e.g., select, determine, etc.) the subset of the processor cores 402A-40C that are to receive the interrupt.

The interrupt controller 404 (e.g., the interface component therein) can connect the interrupt controller 404 to each of the processor cores 402A-402C so that the interrupt controller 404 can deliver a received interrupt to its intended processor core(s). In the interrupt controller 404, there can be a one-to-one correspondence between interface components and the processor cores 402A-402C of the apparatus 400. That is, the controller 404 can include one interface component for each processor core.

In some situations, it is important that all of the TLBI instructions issued by an issuing processor core are completed before the issuing processor core issues any further instructions. To accomplish this, and as mentioned above, a data synchronization barrier (DSB) instruction can be issued at the issuing processor core to suspend processing at the issuing processor core until all TLBI instructions issued at the issuing processor core, including local and global TLBI instructions, are completed. When a DSB instruction is issued after one or more global TLBI instructions, a synchronization mechanism is used to communicate with the remote (i.e., receiving) processor cores and processing is suspended at the issuing processor core until all local TLBI instructions have completed and an acknowledgement is received indicating that the global TLBI instructions have completed at the receiving processor cores.

In this example, the synchronization mechanism includes use of a DSB/GlobalSync interrupt, which can avoid the need to insert a GlobalSync instruction into a receiving processor core's pipeline, and the complexities that as associated with such insertion of an external instruction. That is, after the issuing processor core (e.g., the processor core 402A) completes issuing the TLBI instructions it intends to issue (e.g., the instructions $TLBI_1$, $TLBI_2, \ldots, TLBI_n$), the issuing processor core issues a DSB/GlobalSync interrupt on an interrupt line 408 of the interrupt controller (404). The DSB/GlobalSync interrupt can be issued at the issuing processor core as the issuing processor core suspends executing some or all instructions in its own pipeline until all global TLBI instructions issued at the issuing processor core are completed. In an example, the issuing processor core issues the DSB/GlobalSync interrupt in response to determining that the issued TLBI counter at the issuing processor core has reached a predetermined threshold.

The interrupt controller 404 (e.g., the distributor therein) can identify that a received interrupt is a DSB/GlobalSync interrupt. In an example, at least some of the interrupts received by the interrupt controller can have an associated interrupt ID. Thus, in an example, the DSB/GlobalSync interrupt can be identified as such (i.e., as a DSB/Global- Sync interrupt) via the interrupt ID. For example, the interrupt controller may be configured such that a DSB/GlobalSync interrupt is an interrupt with an ID=128 (or some other value).

In an example, the interrupt controller can identify the processor core that issued the DSB/GlobalSync interrupt. In an example, an identifier of the processor core that issued the DSB/GlobalSync interrupt can be associated with the DSB/GlobalSync interrupt. For example, a processor core ID of 1 may indicate the processor core 402A. In an example, the interrupt controller 404 can have dedicated DSB/GlobalSync interrupt lines for each of the processor cores 402A-402C.

There can be other ways for the interrupt controller 404 to identify the DSB/GlobalSync interrupt and the issuing processor core.

The interrupt controller 404 (e.g., the distributor component therein) sets the target processor core list for the DSB/GlobalSync interrupt to be all but the issuing processor core of the apparatus 400. The controller 404 (e.g., the interface component(s) therein) signals (e.g., asserts) the DSB/GlobalSync interrupt to each of the target processor cores. Each receiving processor core can have one or more interrupt lines for receiving interrupts. For example, the interrupt lines may include a Fast Interrupt reQuest (FIQ) line, an Interrupt ReQuest (IRQ) line, a DSB/GlobalSync interrupt line for receiving DSB/GlobalSync interrupts, more, fewer, other interrupt lines, or a combination thereof.

In an example, when a receiving processor core receives the DSB/GlobalSync interrupt, the receiving processor core attaches the DSB/GlobalSync interrupt to an instruction (i.e., a DSB-attached instruction) of an executing program in the receiving processor core. In another example, a trap instruction (also referred to as a DSB-attached instruction) can be locally generated and inserted into the pipeline by circuitry used for performing interrupt actions. Such a trap instruction can be inserted into the pipeline in the program order more easily than an externally received instruction using the interrupt mechanisms, which are configured to be able to perform interrupt actions in an in-order state. The trap instruction is further described below. Interrupts are handled by a processor core in program order. That is, any instruction before the DSB-attached instruction are executed and retired before any instructions that follow the DSB-attached instruction. Thus, if any instructions following the DSB-attached instruction were executing, or are executed, out of order, their results are thrown away and execution resumes from the DSB-attached instruction.

The DSB/GlobalSync interrupt may not be a software interrupt. That is, the DSB/GlobalSync interrupt can be a hardware interrupt. That is, the receiving processor core does not invoke a software interrupt handler. Rather, the DSB/GlobalSync interrupt can be a hardware interrupt that is handled via hardware circuitry. The DSB/GlobalSync interrupt can be received at an interrupt line 410 that is not software-visible. Thus, the DSB/GlobalSync interrupt is received on an interrupt line 410B, 410C of the processor cores 402B, 402C, respectively.

When the receiving processor core handles the DSB/GlobalSync interrupt (such as when the DSB-attached instruction is completed), the receiving processor core acknowledges the DSB/GlobalSync interrupt to the controller 404. For example, the receiving processor core acknowledges the DSB/GlobalSync interrupt to its corresponding interface component of the controller 404. In an example, acknowledging the DSB/GlobalSync interrupt can mean that the receiving processor core writes the acknowledgement (e.g., a bit) to a register of the interface component to indicate completion of the DSB/GlobalSync interrupt. Acknowledging an interrupt, as used herein, means that the receiving processor core has completed the handling of the interrupt. It is noted that there can be other intermediate acknowledgements between the time that a receiving processing unit first notices the interrupt and the time that the interrupt is considered completely handled.

In an example, a receiving processor core can examine its remote TLBI counter. If the remote TLBI counter is zero, then the receiving processor core sends an acknowledgement of the DSB/GlobalSync interrupt. As such, the acknowledgement is an acknowledgment that all TLBI instructions pending at the receiving processor core have been retired. In another example, each receiving processor core can maintain a respective remote TLBI counter for each of the other processor cores in the computing system. As such, the receiving unit can separately acknowledge completion of TLBI instructions in its pipeline that were due to (i.e., received from) particular issuing processor cores.

When all receiving processor cores have indicated completion of all necessary interrupt actions for their respective DSB/GlobalSync interrupts, the interrupt controller 404 (e.g., the distributor therein) can change the status of the DSB/GlobalSync interrupt received from the issuing processor core to a status that indicates that actions associated with the received DSB/GlobalSync interrupt have been completed. For example, the distributor can set the status to inactive, completed, or any other status that indicates that the DSB/GlobalSync interrupt has been handled by all receiving processor cores.

The interrupt controller 404 sends an acknowledgement to the issuing processor core that the DSB/GlobalSync interrupt has been handled by all receiving processor cores. In an example, the acknowledgement can be an explicit acknowledgement. In an example, the acknowledgement can be implicit. For example, when the issuing processor core notices that the status of the DSB/GlobalSync interrupt is such that the DSB/GlobalSync interrupt has been handled by all receiving processor cores, the issuing processor core resumes processing (e.g., a next instruction is issued).

Figure 5:
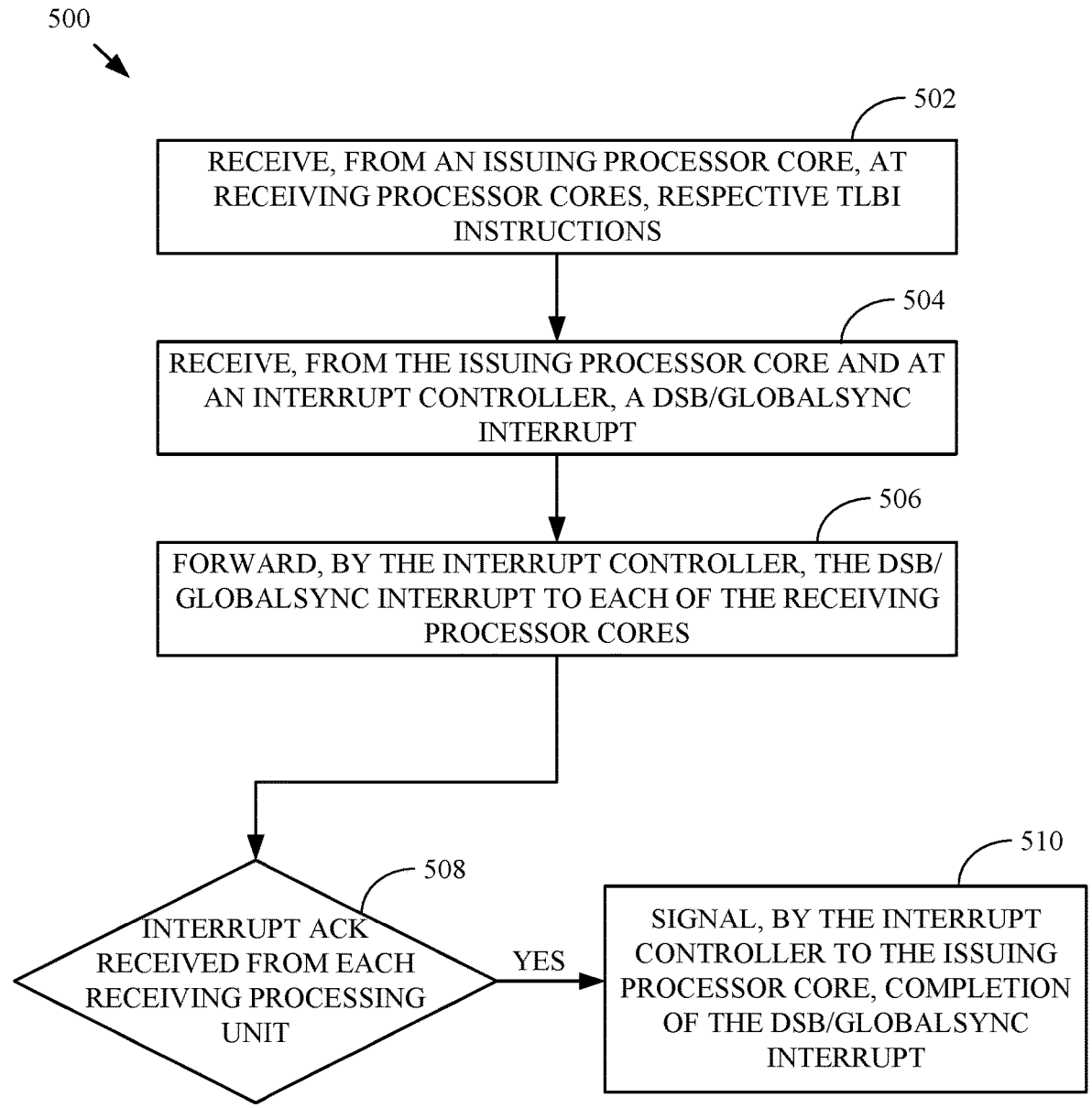
FIG. 5 is a flowchart of a technique for managing processor core synchronization for translation lookahead buffer (TLB) invalidation (TLBI).

FIG. 5 is a flowchart of a technique 500 for managing processor core synchronization for translation lookahead buffer (TLB) invalidation (TLBI). The technique 500 can be implemented in a computing system, such as the computing system 100 of FIG. 1. The technique 500 can be implemented, at least partially, by an interrupt controller, such as the interrupt controller 404 of FIG. 4 and/or by one or more of processor cores, such as the processor cores 402A-40C of FIG. 4 or one or more processor cores 102 of FIG. 1. The technique 500 can be used to synchronize TLB invalidations.

At 502, the technique 500 receives, from an issuing processor core (e.g., the processor cores 402A of FIG. 4), at receiving processor cores (e.g., the processor cores 402B-402C of FIG. 4), respective TLBI instructions (e.g., $TLBI_1$, $TLBI_2$, ..., $TLBI^n$ of FIG. 4). To receive, as used herein can mean directly receive, indirectly receive, cause to be generated, create, form, produce, select, construct, determine, specify, generate, or other receive in any manner whatsoever. Each of the issuing and receiving processor cores is associated with (e.g., includes) a respective TLB.

At 504, the technique 500 receives, from the issuing processor core and at an interrupt controller (e.g., the interrupt controller 404 of FIG. 4), a DSB/GlobalSync interrupt. The DSB/GlobalSync interrupt indicates a request from the issuing processor core to be notified of when the respective TLBI instructions are completed by the receiving processor cores. In an example, the respective TLBI instructions are all of the TLBI instructions received from any issuing processor core. That is, the respective TLBI instructions can be all of the pending TLBI instructions at the time that the DSB/GlobalSync interrupt was issued by the issuing processing core regardless of the source(s) (i.e., the issuing processor core(s)) of the TLBI instructions. In an example, the respective TLBI instructions are the TLBI instructions received from the issuing processor core of 502.

At 506 of the technique 500, the interrupt controller forwards the DSB/GlobalSync interrupt to each of the receiving processor cores. As described above, the interrupt controller determines a target processor core list and issues the interrupt at a respective interrupt line of each of the processor cores on the target processor core list.

At 508, the technique 500 determines whether a respective DSB/GlobalSync interrupt acknowledgement has been received from each of the receiving processor cores. If so, then the technique 500 proceeds to 510; otherwise, the technique 500 waits at 508.

Each of the receiving processor cores sends a respective DSB/GlobalSync acknowledgement to the interrupt controller, in response to retiring the respective TLBI instructions (i.e., the TLBI instructions that are in its pipeline).

At 510, the technique 500 signals (such as by the interrupt controller) to the issuing processor core, completion of the DSB/GlobalSync interrupt. When the issuing processor core receives the acknowledgement, the issuing processor core can resume execution of a program that the issuing processor core was executing before it issued the DSB/GlobalSync interrupt.

In an example, when a receiving processor core receives the DSB/GlobalSync interrupt, the receiving processor core attaches the DSB/GlobalSync interrupt to an instruction of the receiving processor core. That the DSB/GlobalSync interrupt is attached to an instruction can mean, in the case of out-of-order processing, that subsequent instructions (and possibly the instruction itself) are thrown away and execution resumes from the interrupt, after the interrupt is handled. That an instruction is thrown away can mean that the result of the instruction, which may be saved to a reorder buffer, to a commit buffer, or some other such intermediate structure, is discarded without saving (i.e., committing) to, for example, a registry file.

As such, in an example, the technique 500 can further include retiring, by the receiving processor core, all instructions preceding the instruction in program order; and sending, by the receiving processor core and after the retiring, a DSB/GlobalSync interrupt acknowledgement to the interrupt controller. In an example, sending the DSB/GlobalSync interrupt acknowledgement to the interrupt controller can include updating, by the receiving processor core, a register of the interrupt controller to indicate the DSB/GlobalSync interrupt acknowledgement.

In some situations, instead of attaching the interrupt to program instruction, when the DSB/GlobalSync interrupt is received by a receiving processor core, the receiving processor core can insert a special instruction (e.g., a trap instruction) into the program instructions of a program being executed by the receiving processor core. The trap instruction is such that, all instructions before the trap instruction are retired before any instructions that follow the trap instruction, such as described above with respect to the instruction to which the DSB/GlobalSync interrupt is attached.

In an example, the DSB/GlobalSync interrupt can be received by the receiving processor core at an interrupt line that is not software visible. That the interrupt line is not software visible means that the DSB/GlobalSync interrupt is handled by hardware circuitry and that no software handler is associated with the DSB/GlobalSync interrupt. Such hardware interrupt handling can be more efficient than software interrupt handling, in some implementations.

Figure 6:
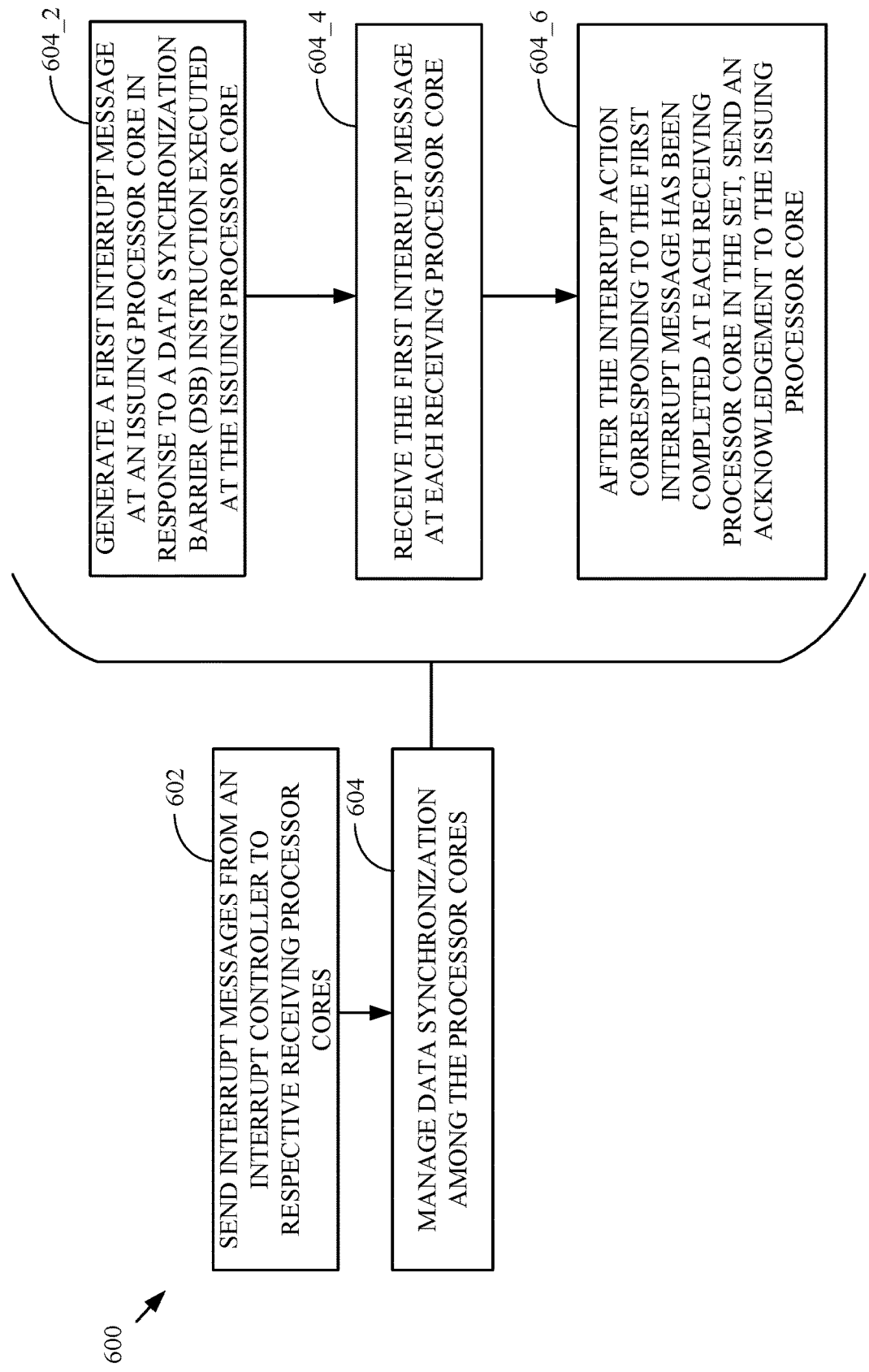
FIG. 6 is a flowchart of another technique for managing processor core synchronization.

FIG. 6 is a flowchart of another technique 600 for managing processor core synchronization. The technique 600 can be used in the context of translation lookahead buffer (TLB) invalidation (TLBI), or in other contexts in which interrupts are used to manage synchronization among processor cores. The technique 600 can be implemented in a computing system, such as the computing system 100 of FIG. 1. The technique 600 can be implemented, at least partially, by an interrupt controller, such as the interrupt controller 404 of FIG. 4 and/or by one or more of processor cores, such as the processor cores 402A-40C of FIG. 4 or one or more processor cores 102. The technique 600 can be used to synchronize TLB invalidations. The technique 600 can be implemented by an integrated circuit, such as the computing system 100 of FIG. 1 or the apparatus 400 of FIG. 4. The integrated circuit can include an interrupt controller, such as the interrupt controller 404 of FIG. 4; and a plurality of processor cores, such as the at least one processor core 102 of FIG. 1.

At 602, the technique 600 sends interrupt messages from an interrupt controller to respective receiving processor cores. Each receiving processor core includes a pipeline, as described with respect to FIG. 2, and circuitry for receiving interrupt messages, such as described with respect to the interrupt line 410 of FIG. 4. As described with respect to FIG. 2, the pipeline includes a plurality of stages through which instructions of a program are executed. The receiving processor core can include (e.g., maintain, etc.) order information (e.g., stored order information) indicating whether instructions of an executing program can be executed out-of-order. Thus, the stored order information indicates whether a state of the pipeline is in-order or out-of-order with respect to instructions that have been issued but are not yet committed.

The receiving processor core performs an interrupt action in response to a corresponding interrupt message after ensuring that the order information indicates that the state of the pipeline is in-order when each interrupt action is performed. That is, the interrupt is said to be taken in program order. In-order retirement of instructions can ensure that the program state (also referred to as the process state) can be recovered in the case of interrupts. The program state can consist of the program counter, the contents of the register file, and the contents of the memory. In performing the interrupt action, the receiving processor core saves the process state, according to the program counter; handles the interrupt; recovers (e.g., reconstitutes, etc.) the process state; and resumes the process at the program counter.

In an example, the interrupt message can be such that it is a hardware interrupt. Thus, the interrupt action associated with the first interrupt message can be a hardware action. That is, each receiving core can include circuitry for handling the interrupt without vectoring to a software handler.

At 604, the technique 600 manages data synchronization among the processor cores. Managing the data synchronization among the processor cores can include steps 604_2-604_6.

At 604_2, the technique 600 generates a first interrupt message at an issuing processor core in response to a data synchronization barrier (DSB) instruction executed at the issuing processor core. The issuing processor core can be as described above with respect to FIG. 4. The first interrupt message can be a DSB/GlobalSync interrupt, as described above.

In the context of managing TLBI instructions, the DSB instruction causes the issuing processing core to determine whether one or more global TLBI instructions were issued by the issuing processing core prior to issuance of the DSB. To do so, in an example, the issuing processing core can determine whether its remote TLBI counter is greater than zero. If the remote TLBI counter is greater than zero, the DSB instruction causes the issuing processing core to halt processing until all of the TLBI instructions broadcast by the issuing processing core have completed. The issuing processor core thus asserts the first interrupt, which can be as described above with respect to the DSB/GlobalSync interrupt. In another example, the issuing processor core does not check its remote TLBI counter to determine whether to assert the first interrupt or not. Rather, the DSB instruction can be immediately followed by the first interrupt.

At 604_4, the technique 600 receives the first interrupt message at each receiving processor core in a set of one or more processor cores. The set of one or more processor cores can be the processor cores other than the first processor core. For example, and referring to FIG. 4, the set of one or more processor cores can be the set of the processor cores 402B-402C.

Each of the receiving processor cores and the issuing processor core includes a respective translation lookaside buffer (TLB). The respective TLB stores translation information for translating virtual addresses to physical addresses. The respective TLB is configured to invalidate translation information associated with one or more virtual addresses in response to a TLB invalidation (TLBI) operation being received.

A receiving processor core performs the interrupt action associated with the first interrupt message to ensure that all TLBI operations received at the receiving processor core receiving the first interrupt message, before the first interrupt message was received, have been completed.

In an example, each TLBI operation is received at a receiving processor core in an interrupt message. That is, for example, the issuing processing core can assert (e.g., issue) a TLBI interrupt to the interrupt controller. The interrupt controller (for example, a distributor therein), in turn, can identify every other processor core as a receiving processor core and forwards (for example, using respective interface components therein) the TLBI interrupt to the receiving processor core. Thus, the interrupt controller can include a plurality of storage elements (e.g., registers or other form of memory) such that each storage element stores interrupt messages for a particular (e.g., respective) processor core. Circuitry in the receiving processor core can insert a TLBI instruction in the pipeline of the receiving processor core.

At 604_6, the technique 600 sends an acknowledgement to the issuing processor core after the interrupt action corresponding to the first interrupt message has been completed at each receiving processor core in the set of receiving processor cores.

In an example, when a receiving processor core completes the first interrupt message, the receiving processor core sends an acknowledgement to the interrupt controller and the interrupt controller sends the acknowledgement that that particular receiving processor core has completed the first interrupt message to the issuing processor core. As such, the issuing processor core can maintain a list of received acknowledgements and when all acknowledgements from all receiving units have been received, the issuing processing core can consider that TLBI instructions have completed at all of the receiving processing core.

In an another example, the acknowledgements are sent from each receiving processor core to the interrupt controller and from the interrupt controller to the issuing processor core, as described above.

For simplicity of explanation, the techniques 500 and 600 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the interrupt controller 404 of FIG. 4 (and the algorithms, methods, instructions, etc., stored thereon and/or executed thereby, including by the techniques 500 and 600) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
sending interrupt messages from an interrupt controller to respective processor cores,
each processor core including:
a pipeline including a plurality of stages through which instructions of a program are executed, where stored order information indicates whether a state of the pipeline is in one of at least two possible states that include an in-order state and an out-of-order state with respect to instructions that have been issued but are not yet committed; and
circuitry for receiving interrupt messages from the interrupt controller and performing an interrupt action in response to a corresponding interrupt message after ensuring that the order information indicates that the state of the pipeline is in-order when each interrupt action is performed; and
managing data synchronization among the processor cores, the managing comprising:
generating a first interrupt message at an issuing processor core in response to a synchronization related instruction executed at the issuing processor core; and
receiving the first interrupt message at each receiving processor core in a set of one or more receiving processor cores.

2. The method of claim 1, wherein each processor core further includes:
a translation lookaside buffer (TLB) storing translation information for translating virtual addresses to physical addresses and configured to invalidate translation information associated with one or more virtual addresses in response to a TLB invalidation (TLBI) operation being received.

3. The method of claim 2, wherein the interrupt action associated with the first interrupt message comprises ensuring all TLBI operations received at the processor core receiving the first interrupt message, before the first interrupt message was received, have been completed.

4. The method of claim 3, wherein the interrupt messages received from the interrupt controller include:
software interrupts that have corresponding interrupt actions performed in software with one or more instructions for performing the corresponding interrupt action being executed in the pipeline of the processor core receiving a software interrupt, and
hardware interrupts that have corresponding interrupt actions performed in hardware without any instructions for performing the corresponding interrupt action being executed in the pipeline of the processor core receiving a hardware interrupt.

5. The method of claim 4, wherein the interrupt action associated with the first interrupt message is a hardware action.

6. The method of claim 2, wherein each TLBI operation is received at a receiving processor core in an interrupt message.

7. The method of claim 2, wherein the managing comprises:
receiving, from the issuing processor core, at the receiving processor cores, respective TLBI instructions;
receiving, from the issuing processor core and at the interrupt controller, the first interrupt message, wherein the first interrupt message indicates a request from the issuing processor core to be notified of when the respective TLBI instructions are completed by the receiving processor cores;
forwarding, by the interrupt controller, the first interrupt message to each of the receiving processor cores; and
in response to receiving a respective interrupt acknowledgement from each of the receiving processor cores, signaling, by the interrupt controller to the issuing processor core, completion of the interrupt action corresponding to the first interrupt message,
wherein the each receiving processor core sends a respective interrupt acknowledgement to the interrupt controller, in response to retiring, by the each receiving processor core, the respective TLBI instructions.

8. The method of claim 7, further comprising:
in response to receiving, by the receiving processor core, the first interrupt message, attaching, by the receiving processor core, the first interrupt message to an instruction of the receiving processor core.

9. The method of claim 8, further comprising:
retiring, by the receiving processor core, all instructions preceding the instruction in program order; and
sending, by the receiving processor core and after the retiring, an interrupt acknowledgement to the interrupt controller.

10. The method of claim 9, wherein sending, by the receiving processor core and after the retiring, the interrupt acknowledgement to the interrupt controller comprising:
updating, by the receiving processor core, a register of the interrupt controller to indicate the interrupt acknowledgement.

11. The method of claim 7, further comprising:
in response to receiving, by the receiving processor core, the first interrupt message, inserting, by the receiving processor core a trap instruction into a program of the receiving processor core.

12. The method of claim 7, wherein the first interrupt message is received at the interrupt controller at an interrupt line that is not software-visible.

13. The method of claim 1, wherein the interrupt controller includes a plurality of storage elements, each storage element storing interrupt messages for a particular processor core.

14. The method of claim 1, wherein the set of receiving processor cores includes all processor cores other than the issuing processor core.

15. The method of claim 1, wherein the managing further comprises: after the interrupt action corresponding to the first interrupt message has been completed at each processor core in the set, sending at least one acknowledgement to the issuing processor core.

16. The method of claim 15, wherein the at least one acknowledgement comprises acknowledgements sent from each processor core in the set to the interrupt controller and an acknowledgement sent from the interrupt controller to the issuing processor core.

17. An integrated circuit comprising:
an interrupt controller; and
a plurality of processor cores, each processor core including:
a pipeline including a plurality of stages through which instructions of a program are executed, where stored order information indicates whether a state of the pipeline is in one of at least two possible states that include an in-order state and an out-of-order state with respect to instructions that have been issued but are not yet committed, and circuitry for receiving interrupt messages from the interrupt controller and performing an interrupt action in response to a corresponding interrupt message after ensuring that the order information indicates that the state of the pipeline is in-order when each interrupt action is performed;

wherein the processor cores each includes circuitry configured to manage data synchronization among the processor cores, the managing comprising:

generating a first interrupt message at an issuing processor core in response to a synchronization related instruction executed at the issuing processor core; and receiving the first interrupt message at each processor core in a set of one or more receiving processor cores.

18. The integrated circuit of claim 17, wherein the processor cores each further includes:

a translation lookaside buffer (TLB) storing translation information for translating virtual addresses to physical addresses and configured to invalidate translation information associated with one or more virtual addresses in response to a TLB invalidation (TLBI) operation being received.

19. The integrated circuit of claim 18, wherein the interrupt action associated with the first interrupt message comprises ensuring all TLBI operations received at the processor core receiving the first interrupt message, before the first interrupt message was received, have been completed.

20. The integrated circuit of claim 19, wherein the interrupt messages received from the interrupt controller include:

software interrupts that have corresponding interrupt actions performed in software with one or more instructions for performing the corresponding interrupt action being executed in the pipeline of the processor core receiving a software interrupt, and hardware interrupts that have corresponding interrupt actions performed in hardware without any instructions for performing the corresponding interrupt action being executed in the pipeline of the processor core receiving a hardware interrupt.

21. The integrated circuit of claim 20, wherein the interrupt action associated with the first interrupt message is a hardware action.

22. The integrated circuit of claim 18, wherein the managing further comprising:

receiving, from the issuing processor core, at the receiving processor cores, respective TLBI instructions;

receiving, from the issuing processor core and at the interrupt controller, the first interrupt message, wherein the first interrupt message indicates a request from the issuing processor core to be notified of when the respective TLBI instructions are completed by the receiving processor cores;

forwarding, by the interrupt controller, the first interrupt message to each of the receiving processor cores; and in response to receiving a respective interrupt acknowledgement from each of the receiving processor cores, signaling, by the interrupt controller to the issuing processor core, completion of the interrupt action corresponding to the first interrupt message, wherein the each receiving processor core sends a respective interrupt acknowledgement to the interrupt controller, in response to retiring, by the each receiving processor core, the respective TLBI instructions.

23. The integrated circuit of claim 22, wherein at least one of the receiving processor cores is configured to:

in response to receiving the first interrupt message, attach the first interrupt message to an instruction of the at least one of the receiving processor cores.

24. The integrated circuit of claim 23, wherein the at least one of the receiving processor cores is further configured to:

retire all instructions preceding the instruction in program order; and send, after the retiring, an interrupt acknowledgement to the interrupt controller.

25. The integrated circuit of claim 24, wherein to send, after the retiring, the interrupt acknowledgement to the interrupt controller comprises to:

update a register of the interrupt controller to indicate the interrupt acknowledgement.

26. The integrated circuit of claim 22, wherein at least one of the receiving processor cores is configured to:

in response to receiving the first interrupt message, insert a trap instruction into a program of the least one of the receiving processor cores.

27. The integrated circuit of claim 22, wherein the first interrupt message is received at the interrupt controller at an interrupt line that is not software-visible.

28. The integrated circuit of claim 17, wherein the interrupt controller includes a plurality of storage elements, each storage element storing interrupt messages for a particular processor core.

29. The integrated circuit of claim 17, wherein the managing further comprises: after the interrupt action corresponding to the first interrupt message has been completed at each processor core in the set, sending at least one acknowledgement to the issuing processor core.

30. The integrated circuit of claim 29, wherein the at least one acknowledgement comprises acknowledgements sent from each processor core in the set to the interrupt controller and an acknowledgement sent from the interrupt controller to the issuing processor core.

* * * * *